US00RE39443E

(19) United States
(12) Reissued Patent
Schramm

(10) Patent Number: US RE39,443 E
(45) Date of Reissued Patent: Dec. 26, 2006

(54) FLUID POWERED BUBBLE MACHINE WITH SPILL-PROOF CAPABILITY

(76) Inventor: Michael R. Schramm, 350 W. 2000 South, Perry, UT (US) 84302

(21) Appl. No.: 09/867,320

(22) Filed: May 29, 2001

Related U.S. Patent Documents

Reissue of:
(64) Patent No.: 5,908,057
Issued: Jun. 1, 1999
Appl. No.: 09/021,617
Filed: Feb. 10, 1998

U.S. Applications:

(63) Continuation of application No. 08/608,854, filed on Feb. 29, 1996, now Pat. No. 5,832,969, which is a continuation-in-part of application No. 08/086,541, filed on Jul. 1, 1993, now Pat. No. 5,495,876, which is a continuation-in-part of application No. 07/828,345, filed on Jan. 30, 1992, now Pat. No. 5,246,046.

(51) Int. Cl.
*B65B 1/04* (2006.01)

(52) U.S. Cl. ..... 141/98; 141/339; 141/311 A; 446/20

(58) Field of Classification Search ..... 141/331, 141/339, 340, 364, 98, 94, 95, 311 A, 333; 220/731, 734, 719; 222/109, 570, 571, 567, 222/569; 4/283, 259, 541.4; 446/15–21, 74; 60/486, 484

See application file for complete search history.

(56) References Cited

U.S. PATENT DOCUMENTS

| | | | | | |
|---|---|---|---|---|---|
| 676,924 | A | | 6/1901 | Steiger | 4/283 |
| 1,074,336 | A | * | 9/1913 | Wismar | 239/231 |
| 1,210,397 | A | | 1/1917 | Bang | 4/283 |
| 1,254,714 | A | | 1/1918 | McCombs | |
| 1,720,374 | A | * | 7/1929 | Mowbray | 239/231 |
| 2,440,783 | A | | 5/1948 | Peart | 4/286 |
| 2,547,825 | A | | 4/1951 | King | 446/16 |
| 2,810,491 | A | | 10/1957 | Goldschidt | 220/719 |
| 2,858,639 | A | | 11/1958 | Lawrence | |
| 3,579,898 | A | | 5/1971 | Hein | 46/7 |
| 3,818,627 | A | | 6/1974 | Labensfeld | 446/15 |
| 3,913,260 | A | | 10/1975 | Corbett | 446/16 |
| 3,971,157 | A | | 7/1976 | Gillis | 446/7 |
| 4,044,496 | A | | 8/1977 | Jernstrom | 446/16 |
| 4,180,938 | A | | 1/1980 | La Fata | 46/6 |
| 4,447,982 | A | * | 5/1984 | Gushea | 46/8 |
| 4,576,582 | A | | 3/1986 | Panzarella | 446/16 |
| D290,859 | S | | 7/1987 | Nagode et al. | D21/124 |

(Continued)

FOREIGN PATENT DOCUMENTS

| | | | |
|---|---|---|---|
| EP | 0094532 | 11/1983 | 446/16 |

OTHER PUBLICATIONS

Little Kids, product packaging for No–spill bubble mug and tumbler, 2 pages, 1995.
TOI, product packaging for bubble brush, 1 page, no date.
TOI, product packaging for snap–on bubble container, 1 page, 1993.
Remco, product packaging for bubble glider, 1 page, 1992.
SpectraStar, product packaging for bubble kit, 1 page, 1992.
Avon, product packaging for fingernail polish container, 1 page, no date.
One Step Ahead, spill proof paint cups, p. 46, no date.

*Primary Examiner*—Steven O. Douglas
(74) *Attorney, Agent, or Firm*—Michael R. Schramm

(57) ABSTRACT

An apparatus for producing both bubbles and streams of water that because of its unique geometry and design, will when oriented in any position prevent spillage of its bubble solution when filled to the fill line or below, and is capable of automatic and continuous bubble generation while simultaneously generating amusing water streams. It is principally intended for use by young children as a lawn water toy as well as a bubble creating device.

26 Claims, 11 Drawing Sheets

U.S. PATENT DOCUMENTS

| | | | | | |
|---|---|---|---|---|---|
| 4,764,141 | A | * | 8/1988 | D'Andrade | 446/16 |
| 4,775,348 | A | | 10/1988 | Collins | 446/16 |
| 4,809,507 | A | * | 3/1989 | Pelto | 60/486 |
| 4,840,597 | A | | 6/1989 | Perez | 446/16 |
| 4,955,840 | A | | 9/1990 | Moomaw | 446/17 |
| 4,981,239 | A | | 1/1991 | Cappel et al. | 222/109 |
| 4,984,714 | A | | 1/1991 | Sledge | 222/109 |
| 5,022,559 | A | | 6/1991 | Condon | 222/109 |
| 5,088,950 | A | | 2/1992 | LaFata | 446/19 |
| 5,105,975 | A | | 4/1992 | Patterson | 220/709 |
| 5,169,026 | A | | 12/1992 | Patterson | 220/719 |
| 5,230,106 | A | * | 7/1993 | Henkin et al. | 4/541.4 |
| 5,297,979 | A | | 3/1994 | Amron | 446/16 |
| 5,304,085 | A | | 4/1994 | Novak | 446/15 |
| 5,395,274 | A | * | 3/1995 | Myers | 446/16 |
| 5,495,876 | A | * | 3/1996 | Schramm | 446/15 |
| 5,613,890 | A | * | 3/1997 | DeMars | 446/15 |
| 5,678,684 | A | | 10/1997 | Wright | 206/204 |
| 6,135,842 | A | | 10/2000 | LaFata | 446/15 |
| D433,633 | S | | 11/2000 | La Fata | D9/519 |

* cited by examiner

FLUID POWERED BUBBLE MACHINE WITH SPILL-PROOF CAPABILITY

Matter enclosed in heavy brackets [ ] appears in the original patent but forms no part of this reissue specification; matter printed in italics indicates the additions made by reissue.

This application is a continuation of application Ser. No. 08/608,854 filed Feb. 29, 1996, *now U.S. Pat. No. 5,832,969* which was a continuation-in-part of application Ser. No. 08/086,541 filed Jul. 1, 1993 and since issued Mar. 5, 1996 as U.S. Pat. No. 5,495,876 which was a continuation-in-part of application Ser. No. 07/828,345 filed Jan. 30, 1992 and since issued Sep. 21, 1993 as U.S. Pat. No. 5,246,046. The benefit of the filing date of this earlier filed application is claimed under 35 U.S.C. § 120.

BACKGROUND OF THE INVENTION

The present invention relates to improved machines for blowing bubbles as well as to improved machines for providing water spray for amusement. The invention has particular application for use with bubble solution of the type used by children in blowing bubbles.

It is well known that bubble machines have existed for some time and are commercially available in a variety of embodiments. Prior to applicant's co-pending application, and other applications by applicant which have matured into U.S. patents, these bubble machines have been of a type and geometry which provided no resistance to spillage of liquid contents of the machine. In addition, a variety of water toys have long existed that provide an amusing spray of water as well actuate movement of cartoon characters or cause the cartoon characters to spray water.

SUMMARY OF THE INVENTION

The present invention relates to an improved fluid powered bubble machine having various impellers, fans, axles and gear working in combination and wherein water from a source such as a garden hose activates the bubble machine to generate a continuous stream of bubbles. The machine can be used in combination with a sprinkler to generate both a stream of bubbles from one end on the machine, and a stream of water from the other end. In different embodiments of the present invention, selective channeling of the sprinkler portion of the bubble machine creates amusing and intermittent streams of water. In some instances, only the bubble portion of the machine is in use and the sole result is a pleasing, continuous stream of bubbles. In other instances, only the sprinkler portion of the machine is in use and the sole result is the generation of streams of water useful for either water play or for watering the lawn or other vegetation. In yet another embodiment, the water sprinkling portion of the apparatus has a non-fluid powered bubble machine, such as a battery powered bubble machine mounted on top. In its ideal use, both the sprinkler and bubble portion of the bubble machine are in use resulting in both a continuous stream of bubbles and streams of water, thereby maximizing the pleasure potential and utility of the invention.

In a preferred embodiment of the present invention, the fluid powered bubble machine comprises an impeller housing which encloses an impeller and which has a threaded opening for connection to a standard garden hose. On one side wall of the housing is another opening that forms a channel for providing fluid communication between the inner cavity of the housing and a fluid tank. Water flowing into the bubble machine from the garden hose or other water source flows past the impeller causing the impeller to act as a hydraulic motor which powers other portions of the bubble machine which are described below. In the preferred embodiment, a hollow cylinder is provided for rotation within the fluid tank. The hollow cylinder rotates in response to torque from the hydraulic motor and causes a constantly changing portion of ports to be alternately open and closed. This, in turn, causes the water streams to be intermittent. Throughout the rotation cycle of the hollow cylinder, there are always one or more ports in the open position, so as to allow the water to flow continuously. After flowing past the impeller, the water flows into the hollow cylinder within the fluid tank and is ported out via a plurality of channels that guide the water into streams emanating radially outward and upward from the fluid tank.

On a second side wall of the impeller housing is a sealed, second opening for a geared axle. The axle is attached to the impeller at one end thereof, and is rotatably connected to a second impeller or fan. While the second impeller is not hydraulically ported to the hydraulic motor, torque from the hydraulic motor rotates the geared axle causing the second impeller to turn. Rotation of the second impeller generates an air stream. A bubble solution container is attached to the upper end of the bubble machine. The bubble solution container has an opening in the top surface and a funnel depending from the top surface into the inner cavity of the container. A bubble wheel, having bubble openings at the periphery of the bubble wheel, is positioned within the funnel and is rotatably connected to an extension of the geared axle. Rotation of the geared axle thus synchronously rotates both the second impeller and the bubble wheel. The diameter of the bubble wheel is sufficiently large such that an upper portion of the bubble wheel is continuously outside of the bubble container and is thereby exposed to the continuous air stream generated by the rotation of the second impeller. When a thin film of bubble solution adheres to the bubble openings at the periphery of the bubble wheel, the continuous air stream generated by the second impeller creates a continuous stream of bubbles.

Accordingly, in the preferred embodiment of the present invention wherein both the bubble machine and the sprinkler portion are in operation, it is an object of the present invention to provide a fluid powered bubble machine with spill-proof capability by connecting the lower impeller housing spout to a pressurized fluid or water source. The water will turn the impeller, exit the impeller housing through the upper impeller housing spout, enter the fluid tank through the fluid tank attach spout, fill and pressurize the fluid tank, exit through one or more aligned fluid passage holes and fluid passage slots, and create amusing streams of water. In response to the rotation of the impeller, the impeller forward gear will turn the fluid drum gear. Turning of the fluid drum gear will cause various fluid passage holes and fluid passage slots to constantly align and misalign in a predetermined or random pattern. The rotating rearward impeller gear will cause the coupled female fan gear and fan to rotate. Rotation of the fan creates an air stream directed at the bubble wheel. Rotation of the fan, fan axle, and male fan gear also causes rotation of the bubble wheel through the bubble trough. A plurality of bubble orifices placed on the outer periphery of the bubble wheel thus rotates into the bubble trough, picks up a thin film of bubble solution, continues its rotation within the rectangular funnel until the bubble orifices are protruding outside of the container. The air stream "blows" bubbles with the bubble film thereby vacating the bubble orifices. Continued rotation of the bubble wheel results in a continued exposure of bubble film to the air stream.

DESCRIPTION OF DRAWINGS

The objects and many attendant advantages of this invention will be readily appreciated and become readily apparent as the same becomes better understood by reference to the following detailed description, when considered in conjunction with the accompanying drawings and in which like reference numerals designate like parts throughout the figures thereof and wherein.

DETAILED DESCRIPTION OF THE PREFERRED EMBODIMENT

In order to facilitate the understanding of the present invention in reviewing the drawings accompanying the specification, a feature list is provided below. It is noted that like features are like numbered throughout all of the figures.

FEATURE TABLE

| Number | Feature |
|---|---|
| 10 | Bubble machine assembly |
| 12 | Forward end of assembly |
| 14 | Rearward end of assembly |
| 20 | Bubble machine base |
| 22 | Attach pin - machine base |
| 24 | Attach pin - machine base |
| 26 | Attach pin - machine base |

-continued

FEATURE TABLE

| Number | Feature |
|---|---|
| 30 | Fluid tank |
| 32 | Fluid passage hole - fluid tank |
| 34 | Attach receptacle - fluid tank |
| 35 | Attach spout - fluid tank |
| 36 | Attach spout rearward edge - fluid tank |
| 38 | Attach spout inner surface - fluid tank |
| 40 | Fluid drum |
| 41 | Fluid drum open end |
| 42 | Fluid drum gate |
| 44 | Inner gear surface - fluid drum |
| 46 | Fluid passage slot - drum fluid |
| 50 | Lower impeller housing |
| 52 | Attach receptacle - lower impeller housing |
| 54 | Spout - lower impeller housing |
| 56 | Axle retaining slot - lower impeller housing |
| 58 | Stop - lower impeller housing |
| 60 | Upper impeller housing |
| 61 | Upper impeller housing spout |
| 62 | Stepped spout edge - upper impeller housing |
| 64 | Outer spout surface - upper impeller housing |
| 66 | Axle retaining slot - upper impeller housing |
| 68 | Stop - upper impeller housing |
| 70 | Impeller |
| 71 | Impeller forward gear |
| 72 | Impeller rearward gear |
| 74 | Impeller forward axle |
| 76 | Impeller rearward axle |
| 78 | Impeller blade |
| 80 | Fan |
| 82 | Fan axle |
| 83 | Rearward retaining flange - fan axle |
| 84 | Forward retaining flange - fan axle |
| 86 | Male fan gear |
| 87 | Female fan gear |
| 88 | Fan blade |
| 90 | Bubble Wheel |
| 92 | Bubble orifice |
| 94 | Bubble wheel axle |
| 96 | Retaining flange - bubble wheel |
| 98 | Bubble wheel gear |
| 100 | Lower solution container shell |
| 102 | Bubble solution trough - lower shell |
| 104 | Connecting flange - lower shell |
| 106 | Attach receptacle - lower shell |
| 108 | Fill line |
| 110 | Upper solution container shell |
| 112 | Funnel - upper shell |
| 114 | Funnel upper opening - upper shell |
| 116 | Funnel lower opening - upper shell |
| 118 | Axle retaining slot - funnel |
| 120 | Connecting flange - upper shell |
| 122 | Fan axle trough - upper shell |
| 124 | Forward fan axle retaining flange - upper shell |
| 125 | Rearward fan axle retaining flange - upper shell |
| 126 | Upper shell fill spout |
| 130 | Cap |
| 140 | Bubble solution level |

Figure 1:
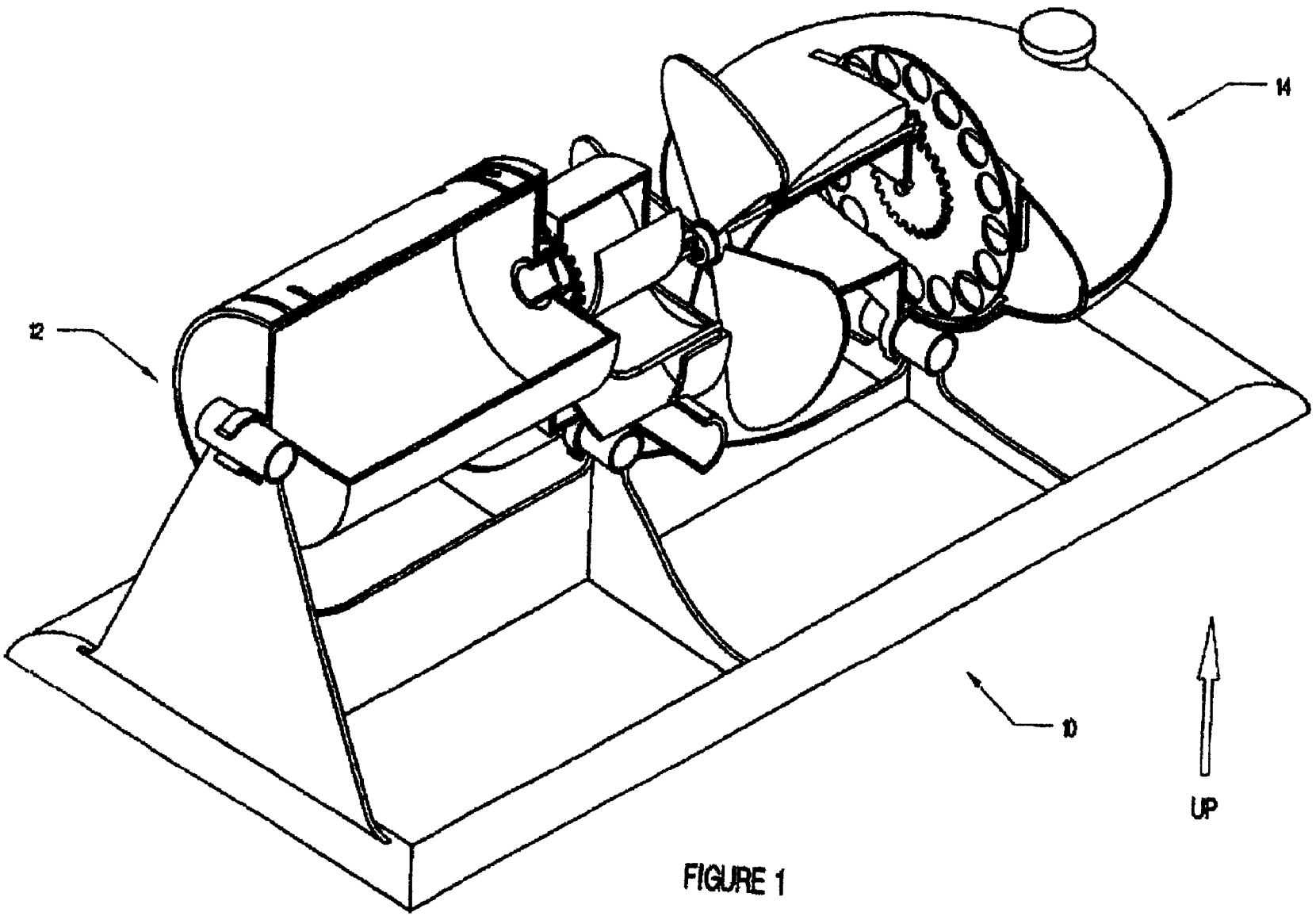
FIG. 1 is an isometric assembly view of the bubble machine (rotated 90 degrees counterclockwise to facilitate a larger scale figure). The front right portion of the solution container shells, lower impeller housing, and fluid tank are shown cut away. The right portion of the upper impeller housing and fluid drum (except for part of the fluid drum gear) are also shown cut away.

Referring now to the drawings and particularly to FIGS. 1 and 2, the invention is a machine 10 that comprises a base 20, a fluid tank 30, a fluid drum 40, a lower impeller housing 50, an upper impeller housing 60, an impeller 70, a fan 80, a bubble wheel, a lower solution container shell 100, an upper solution container shell 110, and a cap 130. The machine 10 has a forward end 12 and a rearward end 14. Base 20 comprises a support base with a plurality of attach pins 22, 24, and 26. The preferred embodiment of the present invention will now be described by further reference to the figures.

Figure 2A:
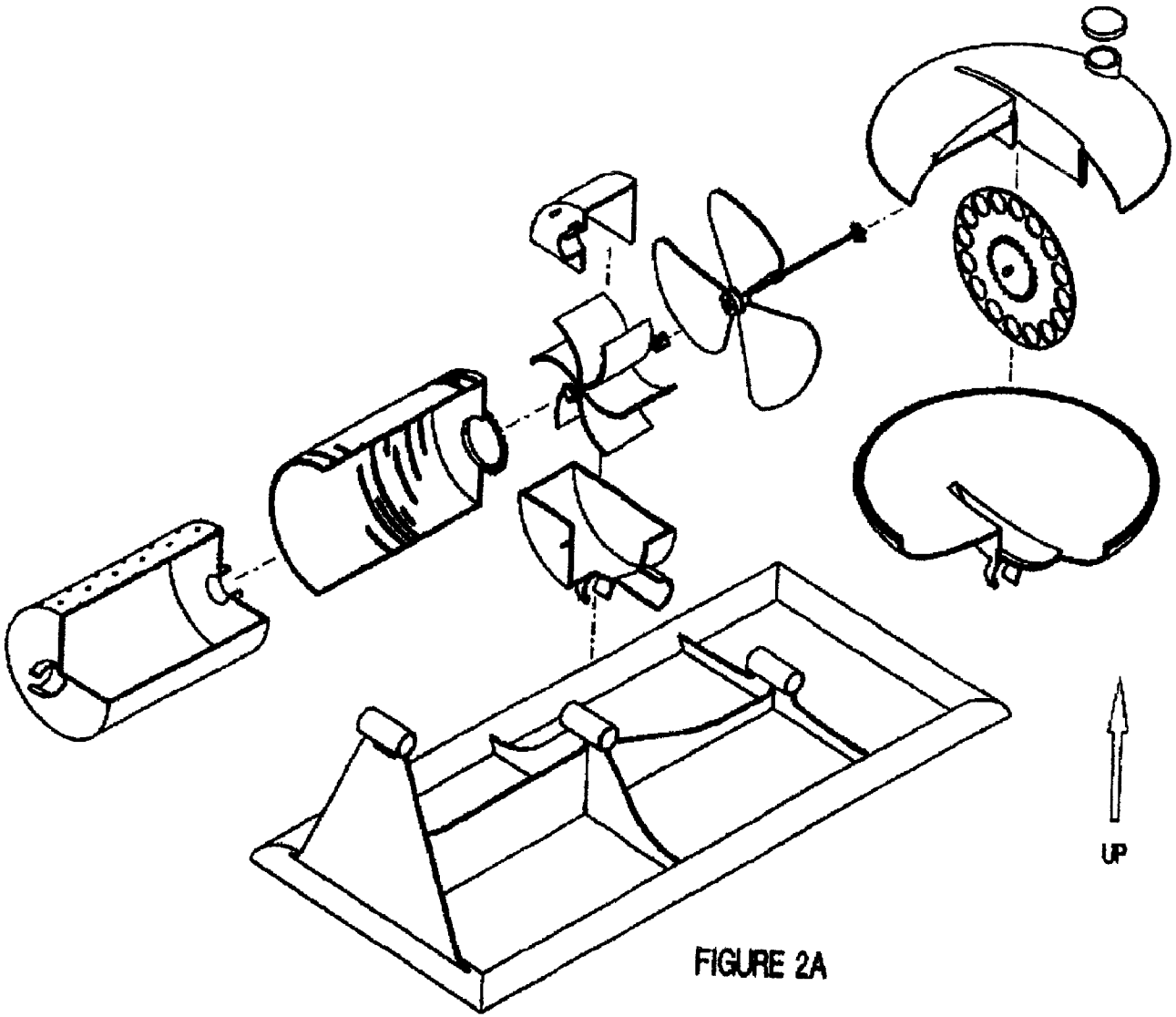
FIG. 2A is an exploded isometric view of the various parts that make up the bubble machine and illustrates their relationship to each other. The portions shown cut away, are identical to that shown in FIG. 1.
Figure 2B:
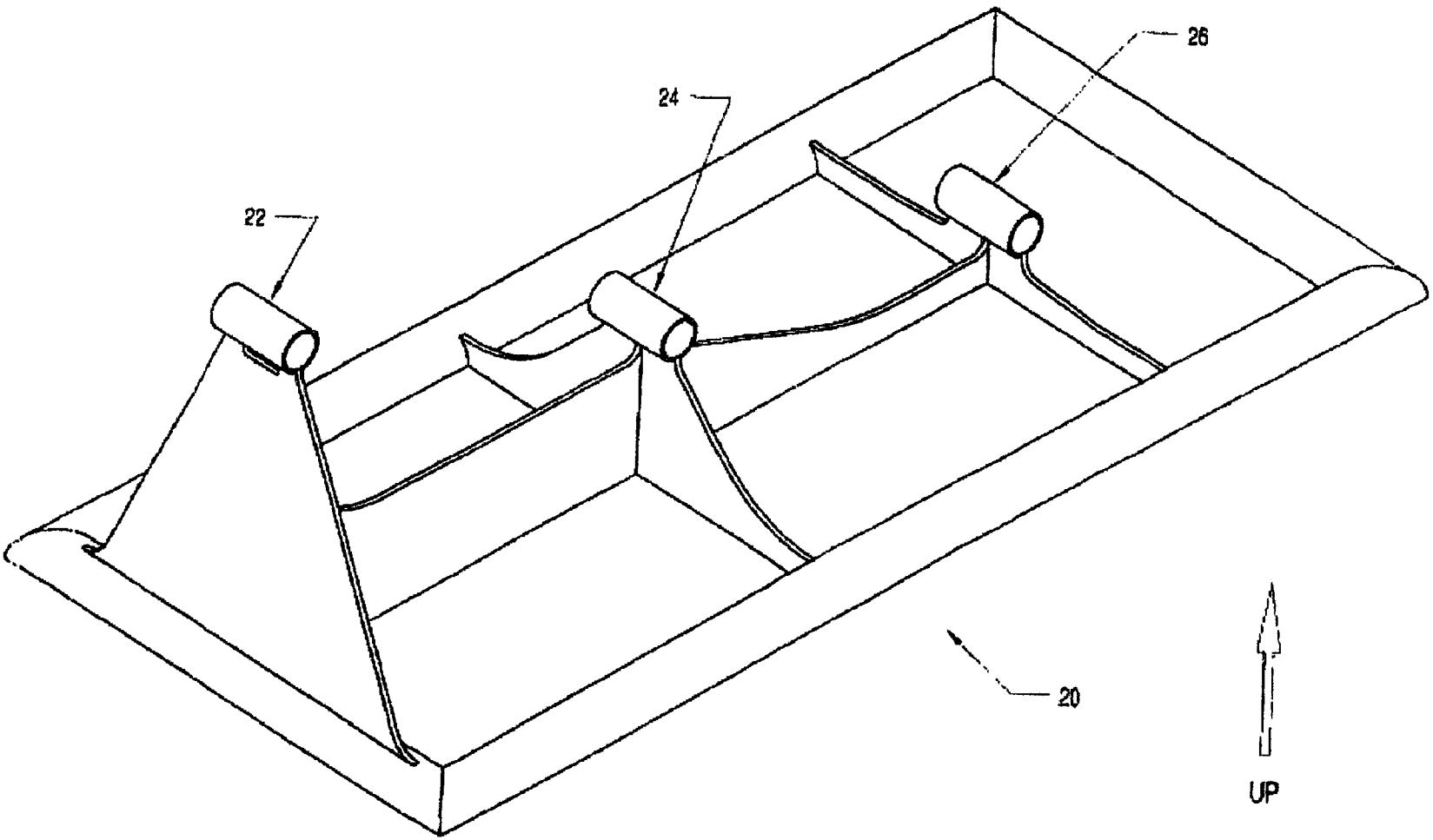
FIG. 2B is an enlarged view of the bubble machine base shown in FIG. 2A.
Figure 2C:
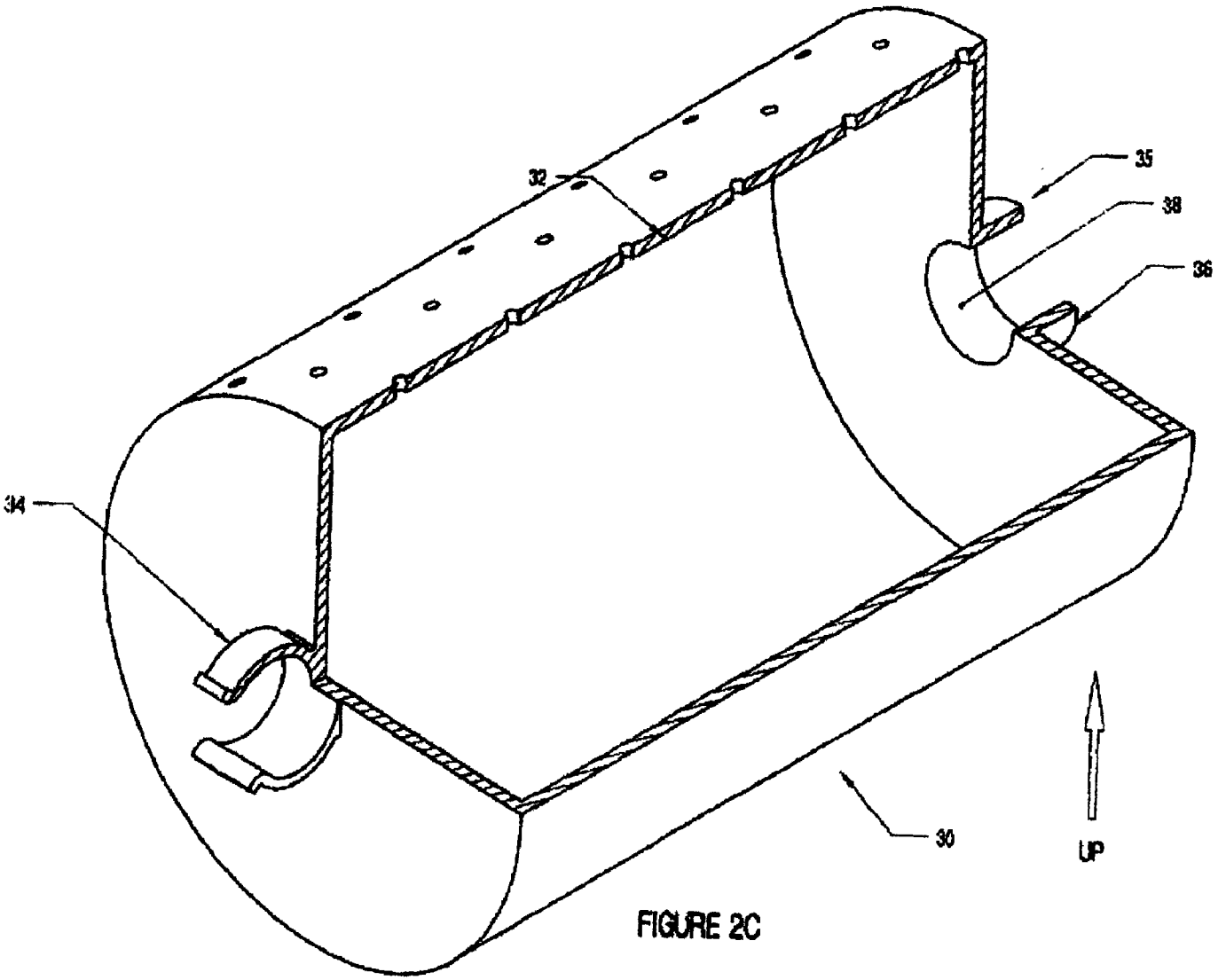
FIG. 2C is an enlarged view of the fluid tank shown in FIG. 2A.

As can be seen from FIG. 2C, fluid tank 30 contains a plurality of fluid passage holes 32, an attach receptacle 34, and an attach spout 35. Attach receptacle 34 is adapted to snappingly attach to and be supported by attach pin 22. Rearward edge 36 of attach spout 35 bears against the impeller housing stepped edge 62, and the inner surface 38 of attach spout 35 connects with outer surface 64 of upper impeller housing spout 61.

Figure 2D:
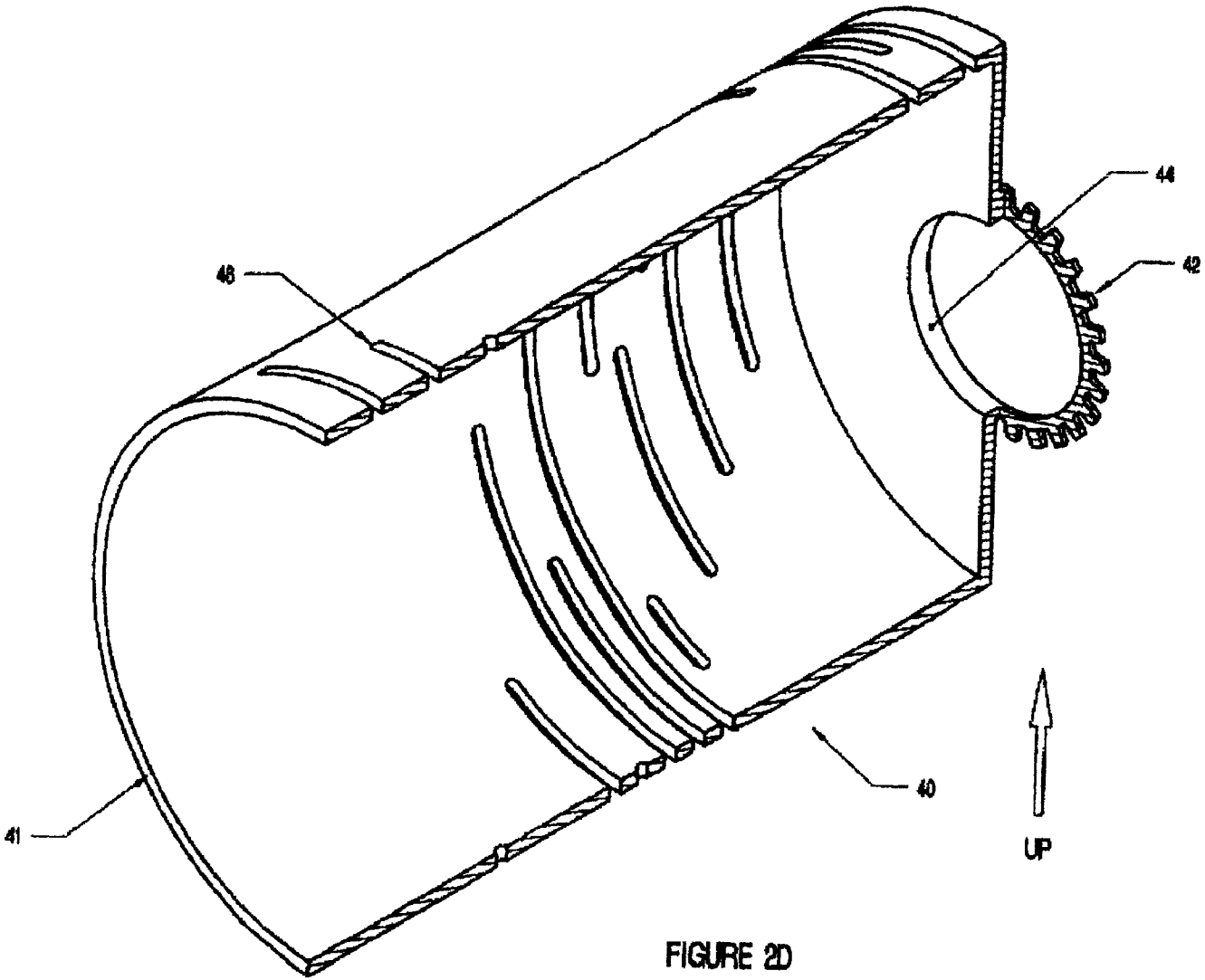
FIG. 2D is an enlarged view of the fluid drum shown in FIG. 2A.

FIG. 2D shows fluid drum 40 having an open end 41, a gear 42, an inner gear surface 44, and a plurality of fluid passage slots 46. Fluid drum 40 is adapted to reside on and rotate about fluid tank 30. The inner gear surface 44 is adapted to allow attach spout 35 and attach spout 61 to be in coupling engagement within and to pass through the inner gear surface 44.

Figure 2E:
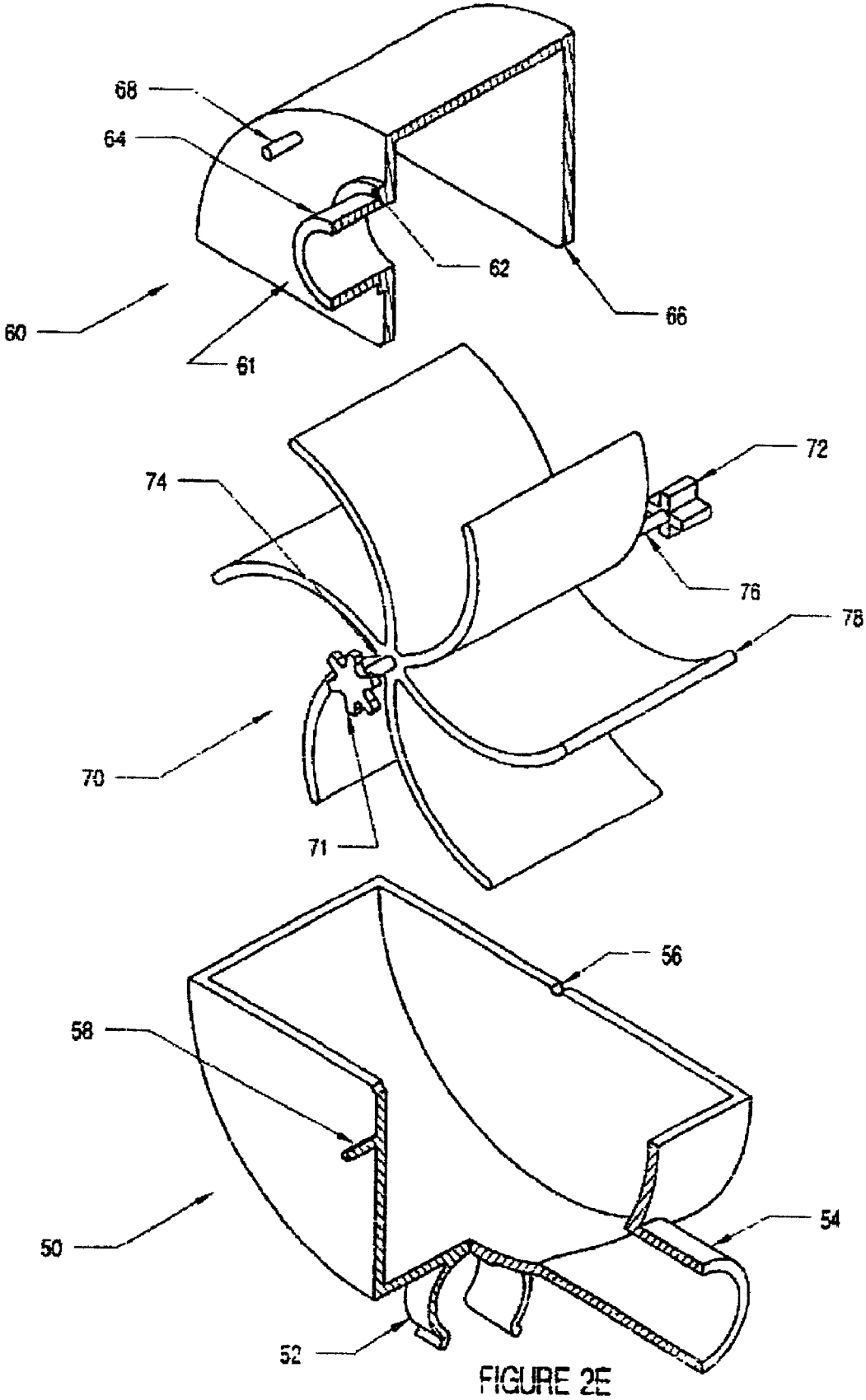
FIG. 2E is an enlarged view of the impeller housings and impeller shown in FIG. 2A.

As can be seen from FIG. 2E, an impeller housing is defined by a lower impeller housing 50 and an upper impeller housing 60. Lower impeller housing 50 is further defined as having an attach receptacle 52, a spout 54, an impeller axle retaining slot 56, and a stop 58. The attach receptacle 52 is adapted to snappingly attach to and supported by attach pin 24. Upper impeller housing 60 is further defined as having a spout 61, a stepped spout edge 62, a spout outer surface 64, an axle retaining slot 66, and a stop 68. The lower impeller housing 50 and the upper impeller housing 60 are adapted to snappingly engage one to another to form a complete impeller housing.

As can also be seen from FIG. 2E, an impeller 70 has a forward gear 71, a rearward gear 72, a forward axle 74, a rearward axle 76, and a plurality of impeller blades 78. Impeller 70 is adapted to be retained by and be rotatable within lower impeller housing 50 and upper impeller housing 60 when the impeller housings are in coupling engagement with one another by means of the impeller axles 74 and 76 being retained by axle retaining slots 56 and 66.

Figure 2F:
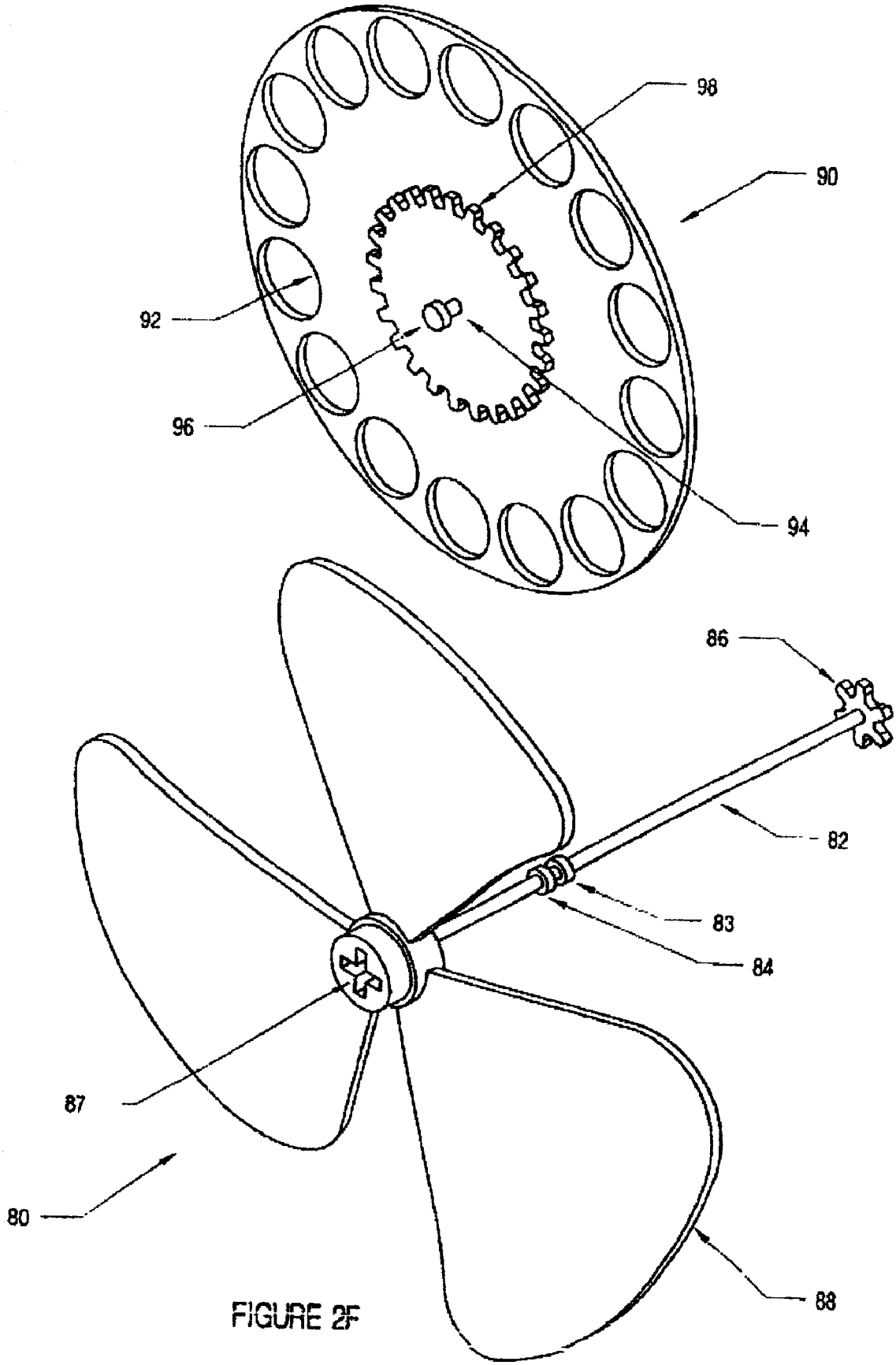
FIG. 2F is an enlarged view of the fan and bubble wheel shown in FIG. 2A.

As shown in FIG. 2F, a fan 80 is provided having fan axle 82, a rearward fan axle retaining flange 83, a forward fan axle retaining flange 84, a male fan gear 86, a female fan gear 87, and a plurality of fan blades 88.

Also shown in FIG. 2F, a bubble wheel 90 has a plurality of bubble orifices 92 about the outer periphery, a bubble wheel axle 94 at the center, at least one bubble retaining flange 96 on the end of the bubble wheel axle 94, and a bubble wheel gear 98. The male fan axle 86 is adapted to mesh with and provide torque to bubble wheel gear 98.

Figure 2G:
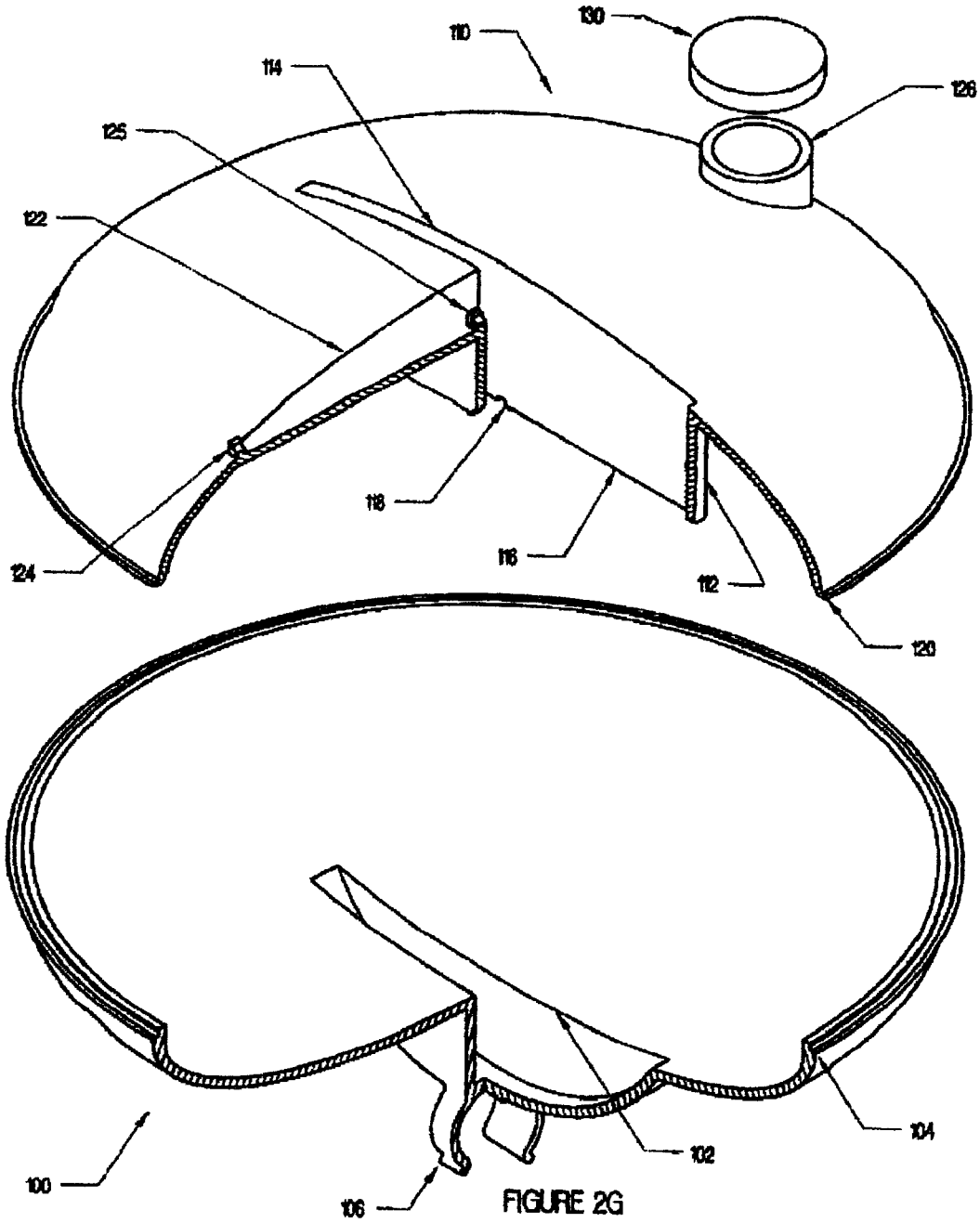
FIG. 2G is an enlarged view of the solution container shells shown in FIG. 2A.

FIG. 2G shows a bubble solution container having a lower solution container shell 100 and an upper solution container shell 110. The lower solution container shell 100 is further defined as a shell having a bubble solution trough 102, a connecting flange 104, an attach receptacle 106, and a fill line 108. The attach receptacle 106 is adapted to snappingly attach to and supported by base attach pin 26.

As is also shown in FIG. 2G, the upper solution container shell 110 is further defined as a shell having a funnel 112, a upper funnel opening 114, a lower funnel opening 116, bubble wheel axle retaining slots 118, a connecting flange 120, a fan axle trough 122, fan axle retaining flanges 124 and 125, and a filling spout 126. The lower solution container shell 100 and upper solution container shell 110 are adapted snappingly attach together by connecting flanges 104 and 120. The fill spout 126 is adapted to threadingly attach to a cap 130. The bubble wheel axle retaining flange 118 is adapted to snappingly attach to and support rotation of the bubble wheel axle 94. The fan axle retaining slots 124 and 125 are adapted to snappingly attach to and support rotation of fan axle 82.

The operation of the present invention can be seen by reference to FIG. 1. When a pressurized fluid source is connected to the lower impeller housing spout 54, the fluid will cause the impeller 70 to rotate by creating a pressure differential on the impeller blades. As impeller 70 rotates, male impeller gear 72 that is coupled to female fan gear 87 causes the fan 80 to rotate. The rotation of impeller 70 also causes impeller forward gear 71 which is meshed with fluid drum gear 42 to rotate the fluid drum. The rotation of fan 80 causes fan blades 88 to generate an air flow in the direction of bubble wheel 90. As fan 80 rotates, male fan gear 86 that is meshed with bubble wheel gear 98 causes bubble wheel 90 to rotate. The rotation of bubble wheel 90 causes bubble orifice 92 to continuously travel through and be immersed in bubble solution in bubble solution trough 102, to travel above funnel upper opening 114, and to expose refreshed bubble orifice 92 to the air stream, thus creating bubbles. After entering through lower impeller housing spout 54 and rotating impeller 70, the pressurized fluid exits upper impeller housing 60 through upper impeller housing spout 61 and simultaneously enters fluid drum 30 through fluid drum attach spout 35.

After entering and pressurizing fluid tank 30, the fluid exits the fluid tank through one or more fluid passage holes 32 and through one or more fluid passage slots 46 and sprays outward. Fluid tank 30 and fluid drum 40 are adapted such that at any given point in the bubble creation cycle and the fluid flow and spray cycle, at least one fluid passage hole 32 and at least one fluid passage slot 46, will always be lined up with one another so to create a constant fluid flow path.

As can be seen by reference to FIG. 2, bubble wheel gear 98 has a diameter less than the diameter of the bubble wheel 90. The bubble wheel 90 is prevented from inadvertently becoming detached from bubble wheel axle retaining slots 118 by bubble wheel axle retaining flanges 96. Retaining flanges 96 also act to keep bubble wheel 90 from rubbing against the sides of funnel 112. Bubble solution is poured into the interior of upper container shell 110 through fill spout 126 to a predetermined level as indicated by fill line 108. The maximum fill line 108 is placed no higher on lower shell 100 than to equal the volume defined by the maximum liquid that can be held in the machine without running out of funnel 112 when oriented in any position.

Figure 3:
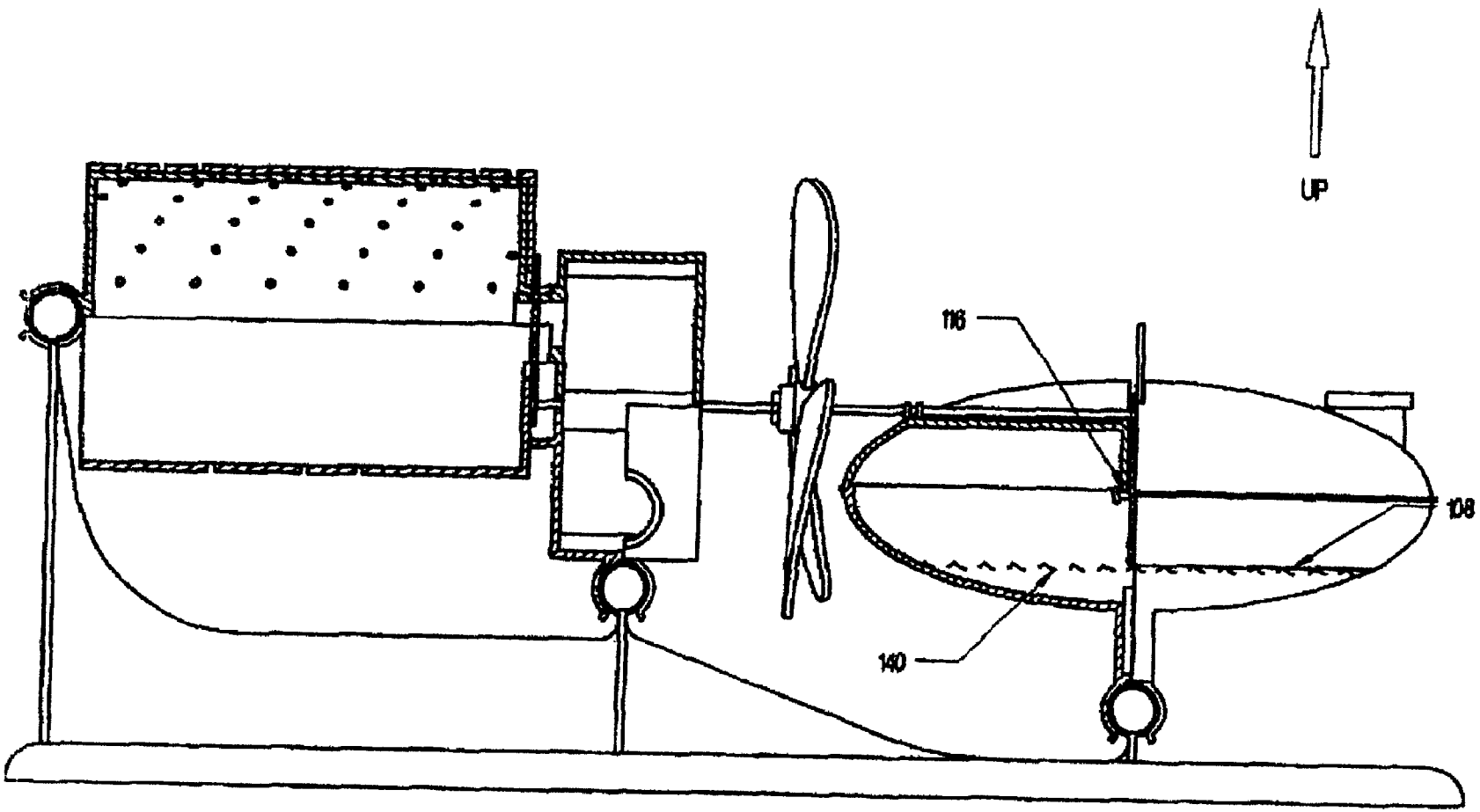
FIG. 3 is an orthographic side view of the bubble machine. The portions shown cut away are the same as in FIG. 1 except that the bubble drum gear is not cut away. The bubble solution is shown retained in the bottom of the lower shell.
Figure 4:
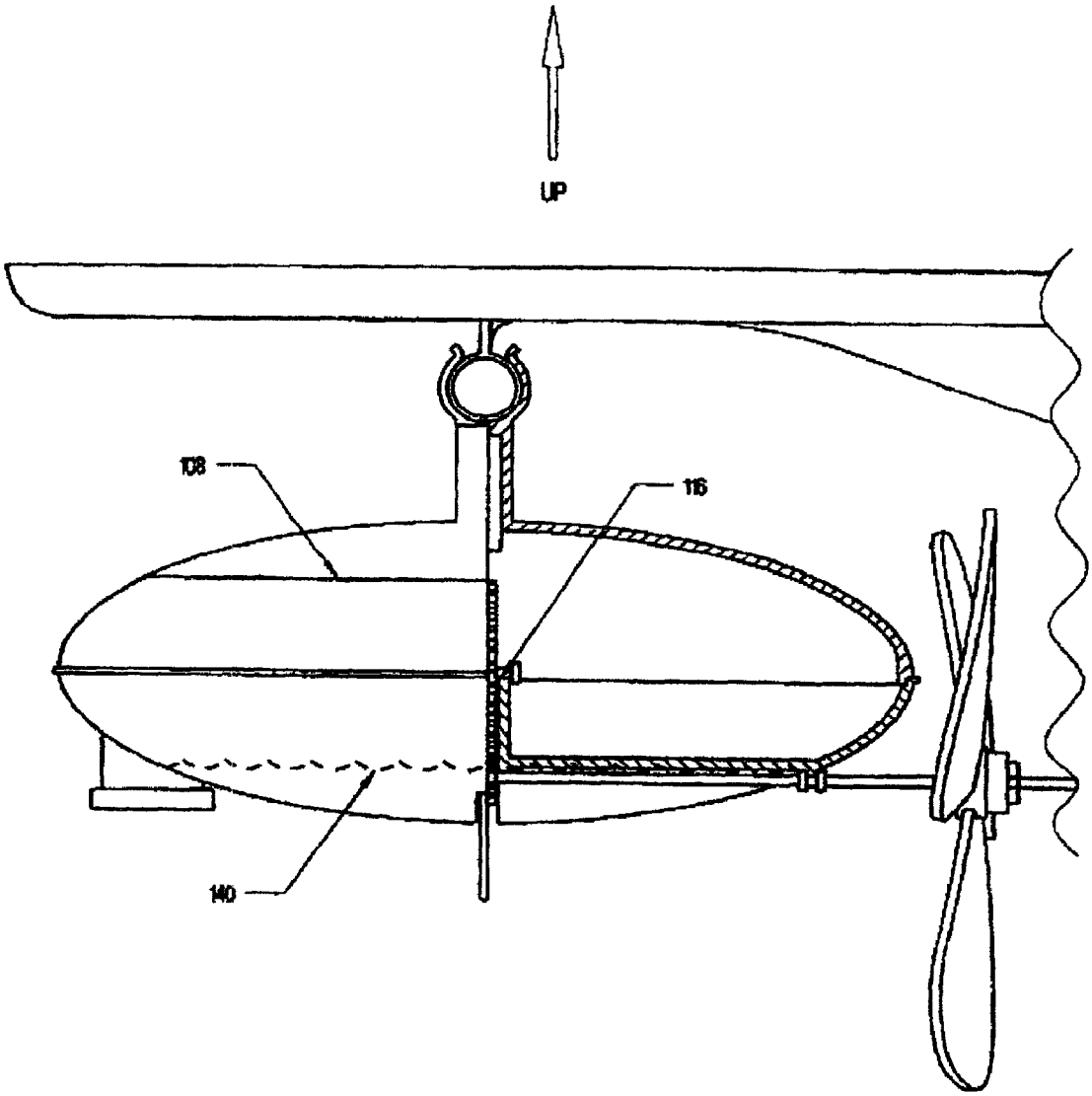
FIG. 4 is a sideways oriented enlargement of the bubble solution container portion of the bubble machine of FIG. 3. The bubble solution is shown retained in the top of the upper shell.
Figure 5:
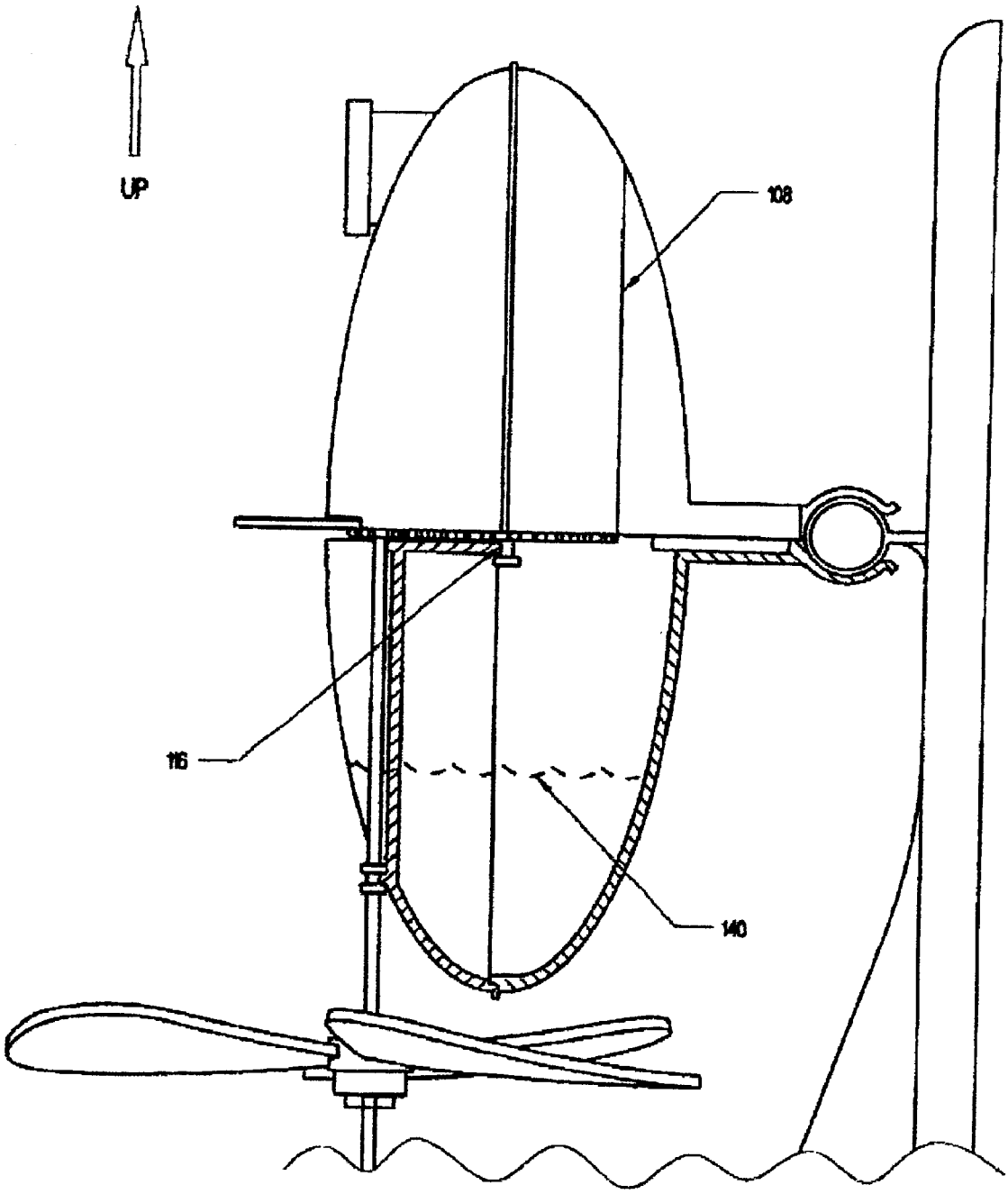
FIG. 5 is an inverted enlargement of the bubble solution container portion of the bubble machine of FIG. 3. The bubble solution is shown retained in the front portions of the upper and lower container shells.

FIGS. 3–5 illustrate the additional unique advantages of spill resistance when fluid is filled at or below the fill line 108 in the subject invention regardless of the various possible orientations. As is apparent from FIG. 3, when the invention is in the upright position liquid will always be below the lower edge 116 of funnel 112. When machine 10 is in the upside down position as in FIG. 4, the liquid will occupy the space immediately around funnel 112 but not be able to enter funnel 112 for discharge through opening 114. When machine 10 is in a sideways position as in FIG. 5, the liquid level will always be between the side of the funnel 112 and the lower side of the two container shells 100 and 110. Furthermore, when the machine 10 is oriented in any of an infinite variations of the above described positions, it will behave in a like manner and prevent the spillage of the solution.

As is seen by reference to FIGS. 1 and 2, in the preferred embodiment, the fluid powered bubble machine of the subject invention is mounted on a base with bubbles being blown from one end and fluid emanating from the other. However, other embodiments of the subject invention could readily be adapted to have the fluid emanate from a vertical fluid tank and the bubble blowing portion of the machine could be mounted above the fluid tank so as to increase the elevation of the bubbles being blow. The entire machine could also be readily adapted to take the from of a fire hydrant, a cartoon character, or other aesthetically pleasing shape.

Lastly, the preferred method of fabrication would be injection molding for high volume low cost production. The material used could be any of a variety of materials such as polyethylene, polypropylene, polyester, nylon, etc. that are compatible with the injection molding process.

While there is shown and described herein certain specific structure embodying the invention, it will be manifest to those skilled in the art that various modifications and rearrangements of the parts may be made without departing from the spirit and scope of the underlying inventive concept. The subject invention is not limited to the particular forms herein shown and described except insofar as indicated by the scope of the appended claims.

I claim:

1. A mechanical toy wherein said toy comprises an automated non-cavitation bubble producing device connected to a non-bubble liquid emitting device, said bubble producing device and said liquid emitting device are adapted to be selectively operated either together or independently of each other *and wherein said toy includes at least one container of the following group of containers comprising a container defining an inner cavity and having a funnel extending into said cavity, a container defining an inner cavity and having a funnel extending into said cavity wherein said funnel is substantially half as long as said container, a container defining an inner cavity and having a substantially rectangular shaped funnel, a container defining an inner cavity and having a funnel extending into said cavity said funnel having an inner opening and wherein said inner opening is substantially centrally located within said cavity and a spill resistant container defining an inner cavity wherein said container provides open access to said cavity and wherein said container resists spillage of liquid contents of said container when said container is oriented in any position*.

2. The toy of claim 1 wherein said liquid is water.

3. The toy of claim 1 wherein said toy is connected to a pressurized water container.

4. The toy of claim 1 wherein said liquid emitting device defines a hydraulic motor having at least one liquid emission port.

5. The toy of claim 4 wherein said automated bubble producing device is actuatingly connected to said hydraulic motor such that a predetermined movement of said hydraulic motor imparts a corresponding predetermined movement to said bubble producing device.

6. The toy of claim 1 wherein said toy further comprises a container defining an inner cavity, said container having an opening in a wall of said container to provide communication between said inner cavity and the exterior of said container, an access device for accessing the liquid contents of said container through said opening, and a hydraulic motor operable in response to liquid flow from a source external to said apparatus, said hydraulic motor imparting movement to said access device for manipulating said access device into and out of contact with the liquid contents of said inner cavity.

7. The toy of claim 1 wherein said toy further comprises a first container defining a first inner cavity, said first container having a funnel integrally formed with and extending into said first inner cavity to provide communication between said first inner cavity and the exterior of said first container to inhibit spillage of the contents of said first container, and an access device for accessing the liquid contents of said first container through said funnel, said apparatus further comprising a second container having a second inner cavity, and a hollow cylinder rotatably mounted within said second inner cavity, said second container having at least one exit port to provide for communication between said second inner cavity and the exterior of said second container, and said hollow cylinder having at least one hole to provide communication between the interior of said hollow cylinder and the interior of said second inner cavity, said apparatus further comprising a hydraulic motor operable in response to liquid flow from a source external to said apparatus, said hydraulic motor imparting movement to said access device for manipulating said access device into and out of contact with the liquid contents of said first inner cavity and said hydraulic motor imparting rotation to said hollow cylinder within said second inner cavity and wherein rotation of said hollow cylinder causes periodic alignment of said at least one hole in said hollow cylinder with said at least one exit port in said second container, and wherein said hydraulic motor comprises an impeller and an impeller housing, said impeller housing having a first opening for receiving said liquid from a source external to said apparatus and a second opening spatially removed from said first opening for permitting said liquid from said external source to exit said impeller housing and wherein said liquid flows into said first opening, past said impeller and exits out said second opening and whereby said liquid flow imparts rotation to said impeller and wherein the rotation of said impeller imparts movement of at least one of said hollow cylinder and said access device, and wherein said impeller is attached to a rotating assembly, said rotating assembly comprising an axle being integrally attached to said impeller at a first end of said axle within said impeller housing, said axle terminating in a second end on the exterior of said impeller housing and wherein said second end of said axle is rotatably and integrally attached to said hollow cylinder for rotation of said hollow cylinder within said second inner cavity, and wherein said second opening in said impeller housing is connected to said second container and provides communication between said impeller housing and said second inner cavity and said hollow cylinder, and wherein said liquid from said external source exits through said second opening in said impeller housing and flows into said hollow cylinder, and whereby rotation of said hollow cylinder permits said liquid to exit through the at least one aligned hole and exit port of said hollow cylinder and said second container in a time interval corresponding to the time in which such alignment is maintained.

8. A non-cavitation bubble creation apparatus comprising a hydraulic motor and a bubble creation device wherein said hydraulic motor is adapted to actuate said bubble creation device, said apparatus further including at least one exit port for the emission of hydraulic fluid *and wherein said apparatus includes at least one container of the following group of containers comprising a container defining an inner cavity and having a funnel extending into said cavity, a container defining an inner cavity and having a funnel extending into said cavity wherein said funnel is substantially half as long as said container, a container defining an inner cavity and having a substantially rectangular shaped funnel, a container defining an inner cavity and having a funnel extending into said cavity said funnel having an inner opening and wherein said inner opening is substantially centrally located within said cavity and a spill resistant container defining an inner cavity wherein said container provides open access to said cavity and wherein said container resists spillage of liquid contents of said container when said container is oriented in any position*.

9. The apparatus of claim 8 wherein the hydraulic fluid for said hydraulic motor is water.

10. The apparatus of claim 8 wherein said apparatus is connected to a pressurized water container.

11. The apparatus of claim 8 wherein said apparatus defines a mechanical toy.

12. The bubble creation device of claim 8 wherein said bubble creation device further comprises a container defining an inner cavity, said container having an opening in a wall of said container to provide communication between said inner cavity and the exterior of said container, and an access device for accessing the liquid contents of said container through said opening, and the hydraulic motor of claim 8, wherein said hydraulic motor is further operable in response to liquid flow from a source external to said apparatus, and wherein said hydraulic motor imparts movement to said access device for manipulating said access device into and out of contact with the liquid contents of said inner cavity.

13. The apparatus of claim 8 wherein said apparatus further comprises a first container defining a first inner cavity, said first container having a funnel integrally formed with and extending into said first inner cavity to provide communication between said first inner cavity and the exterior of said first container to inhibit spillage of the contents of said first container, and an access device for accessing the liquid contents of said first container through said funnel, said apparatus further comprising a second container having a second inner cavity, and a hollow cylinder rotatably mounted within said second inner cavity, said second container having at least one exit port to provide for communication between said second inner cavity and the exterior of said second container, and said hollow cylinder having at least one hole to provide communication between the interior of said hollow cylinder and the interior of said second inner cavity, and the hydraulic motor of claim 8 further being operable in response to liquid flow from a source external to said apparatus, and wherein said hydraulic motor imparts movement to said access device for manipulating said access device into and out of contact with the liquid contents of said first inner cavity and said hydraulic motor imparts rotation to said hollow cylinder within said second inner cavity and wherein rotation of said hollow cylinder causes periodic alignment of said at least one hole in said hollow cylinder with said at least one exit port in said second container, and wherein said hydraulic motor comprises an impeller and an impeller housing, said impeller housing having a first opening for receiving said liquid from a source external to said apparatus and a second opening spatially removed from said first opening for permitting said liquid from said external source to exit said impeller housing and wherein said liquid flows into said first opening, past said impeller and exits out said second opening and whereby said liquid flow imparts rotation to said impeller and wherein the rotation of said impeller imparts movement of at least one of said hollow cylinder and said access device, and wherein said impeller is attached to a rotating assembly, said rotating assembly comprising an axle being integrally attached to said impeller at a first end of said axle within said impeller housing, said axle terminating in a second end on the exterior of said impeller housing and wherein said second end of said axle is rotatably and integrally attached to said hollow cylinder for rotation of said hollow cylinder within said second inner cavity, and wherein said second opening in said impeller housing is connected to said second container and provides communication between said impeller housing and said second inner cavity and said hollow cylinder, and wherein said liquid from said external source exits through said second opening in said impeller housing and flows into said hollow cylinder, and whereby rotation of said hollow cylinder permits said liquid to exit through the at least one aligned hole and exit port of said hollow cylinder and said second container in a time interval corresponding to the time in which such alignment is maintained.

14. An automatic non-cavitation bubble creation apparatus comprising a bubble producing device connected to a pressurized water container *wherein said apparatus includes at least one container of the following group of containers comprising a container defining an inner cavity and having a funnel extending into said cavity, a container defining an inner cavity and having a funnel extending into said cavity wherein said funnel is substantially half as long as said container, a container defining an inner cavity and having a substantially rectangular shaped funnel, a container defining an inner cavity and having a funnel extending into said cavity said funnel having an inner opening and wherein said inner opening is substantially centrally located within said cavity and a spill resistant container defining an inner cavity wherein said container provides open access to said cavity and wherein said container resists spillage of liquid contents of said container when said container is oriented in any position*.

15. The apparatus of claim 14 wherein said bubble producing device and said pressurized water container are connected to a hydraulic motor.

16. The apparatus of claim 15 wherein the hydraulic fluid for said hydraulic motor is water.

17. The apparatus of claim 14 wherein said apparatus defines a mechanical toy.

18. The apparatus of claim 14 wherein said apparatus further comprises a container defining an inner cavity, said container having an opening in a wall of said container to provide communication between said inner cavity and the exterior of said container, an access device for accessing the liquid contents of said container through said opening, and a hydraulic motor operable in response to liquid flow from a source external to said apparatus, said hydraulic motor imparting movement to said access device for manipulating said access device into and out of contact with the liquid contents of said inner cavity.

19. The apparatus of claim 14 wherein said apparatus further comprises a first container defining a first inner cavity, said first container having a funnel integrally formed with and extending into said first inner cavity to provide communication between said first inner cavity and the exterior of said first container to inhibit spillage of the contents of said first container, and an access device for accessing the liquid contents of said first container through said funnel, said apparatus further comprising a second container having a second inner cavity, and a hollow cylinder rotatably mounted within said second inner cavity, said second container having at least one exit port to provide for communication between said second inner cavity and the exterior of said second container, and said hollow cylinder having at least one hole to provide communication between the interior of said hollow cylinder and the interior of said second inner cavity, said apparatus further comprising a hydraulic motor operable in response to liquid flow from a source external to said apparatus, said hydraulic motor imparting movement to said access device for manipulating said access device into and out of contact with the liquid contents of said first inner cavity and said hydraulic motor imparting rotation to said hollow cylinder within said second inner cavity and wherein rotation of said hollow cylinder causes periodic alignment of said at least one hole in said hollow cylinder with said at least one exit port in said second container, and wherein said hydraulic motor comprises an impeller and an impeller housing, said impeller housing having a first opening for receiving said liquid from a source external to said apparatus and a second opening spatially removed from said first opening for permitting said liquid from said external source to exit said impeller housing and wherein said liquid flows into said first opening, past said impeller and exits out said second opening and whereby said liquid flow imparts rotation to said impeller and wherein the rotation of said impeller imparts movement of at least one of said hollow cylinder and said access device, and wherein said impeller is attached to a rotating assembly, said rotating assembly comprising an axle being integrally attached to said impeller at a first end of said axle within said impeller housing, said axle terminating in a second end on the exterior of said impeller housing and wherein said second end of said axle is rotatably and integrally attached to said hollow cylinder for rotation of said hollow cylinder within said second inner cavity, and wherein said second opening in said impeller housing is connected to said second container and provides communication between said impeller housing and said second inner cavity and said hollow cylinder, and wherein said liquid from said external source exits through said second opening in said impeller housing and flows into said hollow cylinder, and whereby rotation of said hollow cylinder permits said liquid to exit through the at least one aligned hole and exit port of said hollow cylinder and said second container in a time interval corresponding to the time in which such alignment is maintained.

20. A mechanical toy defining an automated non-cavitation bubble creation apparatus comprising a hydraulic motor and a non-cavitation bubble creation device wherein said hydraulic motor is adapted to actuate said non-cavitation bubble creation device, said apparatus further including at least one exit port for the emission of hydraulic fluid, and said apparatus being connected to a pressurized water container *and wherein said toy includes at least one container of the following group of containers comprising a container defining an inner cavity and having a funnel extending into said cavity, a container defining an inner cavity and having a funnel extending into said cavity wherein said funnel is substantially half as long as said container, a container defining an inner cavity and having a substantially rectangular shaped funnel, a container defining an inner cavity and having a funnel extending into said cavity said funnel having an inner opening and wherein said inner opening is substantially centrally located within said cavity and a spill resistant container defining an inner cavity wherein said container provides open access to said cavity and wherein said container resists spillage of liquid contents of said container when said container is oriented in any position.*

*21. A non-cavitation bubble creation apparatus comprising a bubble creation device and a container wherein said container defines at least one container of the following group of containers comprising a container defining an inner cavity of a predetermined length and having an open funnel extending into said cavity and wherein said funnel is at least half as long as said length of said cavity, a container defining an inner cavity and having a open funnel extending into said cavity said funnel having an inner opening and wherein said inner opening is substantially centrally located within said cavity, a container defining an inner cavity and having a substantially rectangular shaped open funnel and wherein said container resists spillage of a predetermined amount of liquid contents of said container when said container is oriented in any position, and a container defining an inner cavity having an open non-cylindrical/non-conical funnel and wherein said container resists spillage of a predetermined amount of liquid contents of said container when said container is oriented in any position.*

*22. A non-cavitation bubble creation apparatus comprising a bubble creation device and a container having an inner cavity and an open funnel extending into said cavity wherein said container resists spillage of a predetermined amount of liquid contents of said container when said container is oriented in any position and wherein said bubble creation device defines at least one bubble creation device of the following group of bubble creation devices comprising a bubble creation device having a plurality of bubble orifices, a bubble creation device defining a bubble wheel having at least one bubble orifice, and a bubble creation device having a first portion and a second portion and wherein said first portion includes at least one bubble orifice and wherein said second potion defines a portion that remains within said funnel when a bubble is created.*

*23. A non-cavitation bubble creation apparatus comprising a bubble creation device and a container defining an inner cavity having a first opening wherein said first opening includes a open funnel connected to said first opening and extending into said cavity and wherein said container includes a second opening having an opening cover removeably connected to said second opening and wherein said bubble creation device is mechanically actuateable into and out of said container.*

*24. A non-cavitation bubble creation apparatus comprising a bubble creation device and a container having an inner cavity and an open funnel extending into said cavity wherein said container resists spillage of a predetermined amount of liquid contents of said container when said container is oriented in any position and wherein said bubble creation device defines a bubble creation device having at least one substantially planar bubble orifice defining a plane and wherein said bubble creation device is moveable into and out of said container by moving along a path through said funnel, and wherein said path through said funnel defines an axis, and wherein said axis lies substantially within said orifice plane when said bubble orifice moves through said funnel.*

*25. A non-cavitation bubble creation apparatus comprising a bubble creation device and a container having an inner cavity and an open funnel extending into said cavity wherein said container resists spillage of a predetermined amount of liquid contents of said container when said container is oriented in any position and wherein said bubble creation device is movably connected to said container and wherein said bubble creation device is mechanically actuateable into and out of said container.*

*26. A non-cavitation bubble creation apparatus comprising a bubble creation device having at least one bubble orifice of a predetermined length and a container having an inner cavity and an open funnel of a predetermined length extending lengthwise into said cavity and wherein said length of said funnel exceeds said length of said orifice.*

* * * * *